Jan. 15, 1929.  
E. A. BERNSTEIN  
PROJECTING APPARATUS  
Filed Nov. 15, 1924  
1,698,872  
3 Sheets-Sheet 1

Inventor  
E.A. Bernstein.  
By his Attorneys

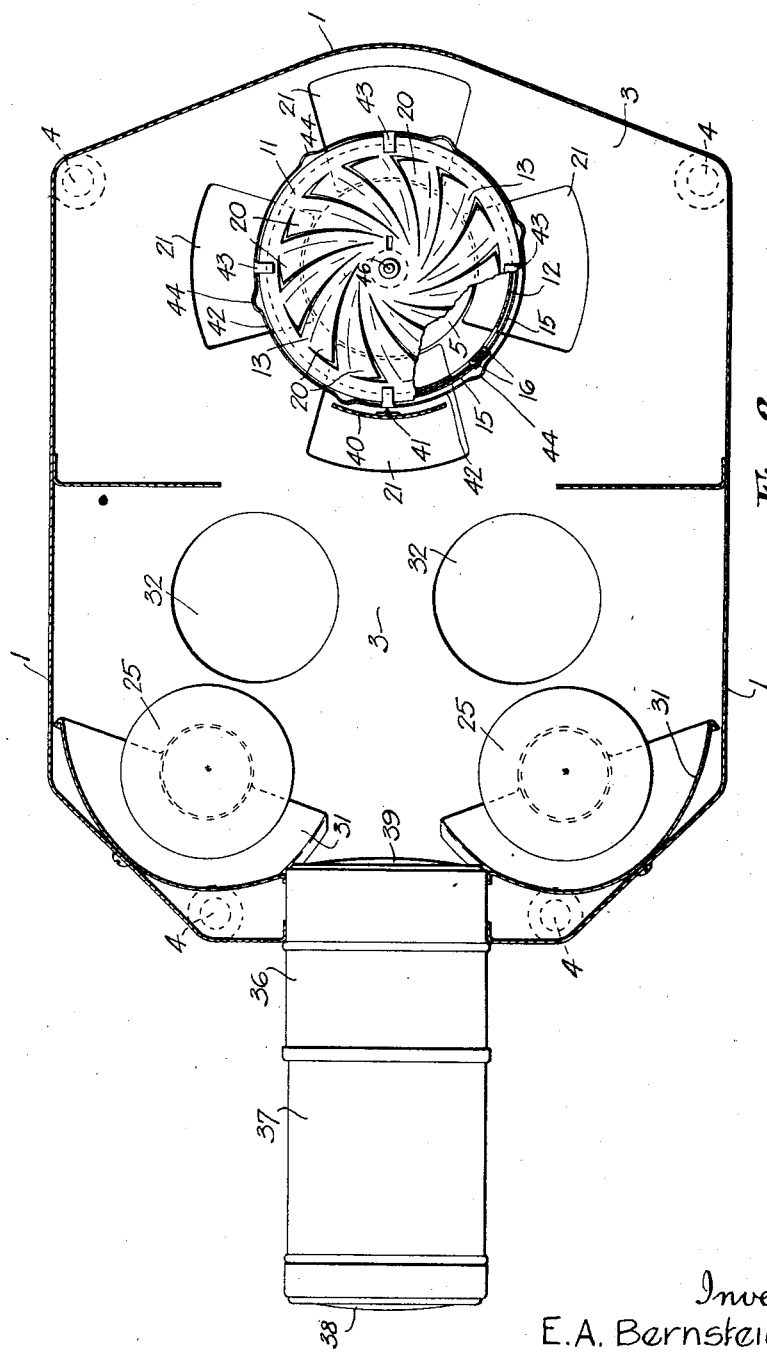

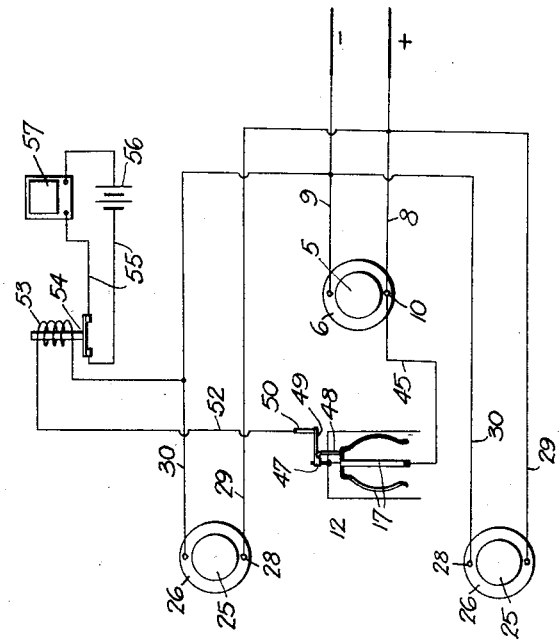
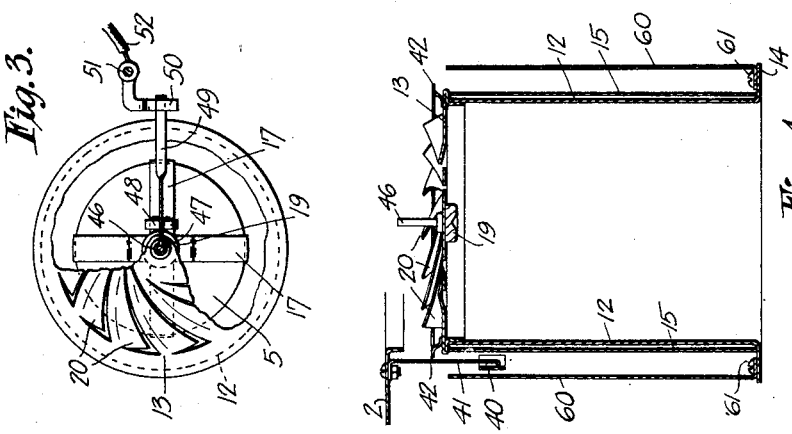

Patented Jan. 15, 1929.

1,698,872

UNITED STATES PATENT OFFICE.

EDWARD ALFRED BERNSTEIN, OF NEW YORK, N. Y.

PROJECTING APPARATUS.

Application filed November 15, 1924. Serial No. 750,027.

This invention relates to a projecting apparatus, particularly intended for advertising or display purposes, or for attracting the attention of the public, by projecting an image or images of the advertising, display or other matter to be brought to the attention of the public, or an image or images of an object or objects, upon a suitable receiving surface or screen.

The invention primarily consists of a rotatable element or cylinder upon which the matter, object or the like, the image of which is to be projected, is or are mounted, means, such as an electric lamp, resistance element or the like for producing a current of heated air, for rotating said element, a light source or sources disposed in front of said rotatable element for illuminating the matter or the like thereon, and a lens or lenses for projecting the reflected light from said illuminated matter or the like onto a suitable receiving surface or screen. By this means successive matter or objects carried by or mounted upon the rotatable element are brought into the range of the light source or sources and are successively illuminated thereby, whereby images of such matter or objects are projected in succession upon the screen or the like.

The invention also consists in the mounting of an object, or the representation of an object, in front of the rotatable element, which object may be such that the projected image thereof will bear a relationship to, or appear as a part of the projected image of pictorial or other matter on said element, and the provision of means on said element for imparting movement, preferably of a periodical or intermittent nature, to said object, so as to produce movement of the projected image of said object relatively to the projected image of the matter on the rotatable element which latter image is of course moving relatively to the projected image of said object due to the rotation of said element.

The invention further consists in the utilization of the rotation of said rotatable element to cause actuation of a relay or other device to electrically control the operation of an audible or visual indicating or signalling device for attracting attention to the projecting apparatus.

The invention in one embodied form thereof is illustrated in the accompanying drawings, in which:—

Figure 2 is a sectional plan view of the apparatus shown in Figure 1, Figure 3 is a detailed plan view of the contact parts shown in Figure 1, and Figure 4 is a view of the rotatable element or cylinder 11, showing the manner of mounting additional matter or objects thereon.

Figure 5 is a diagram showing the electrical connections.

Figure 1:
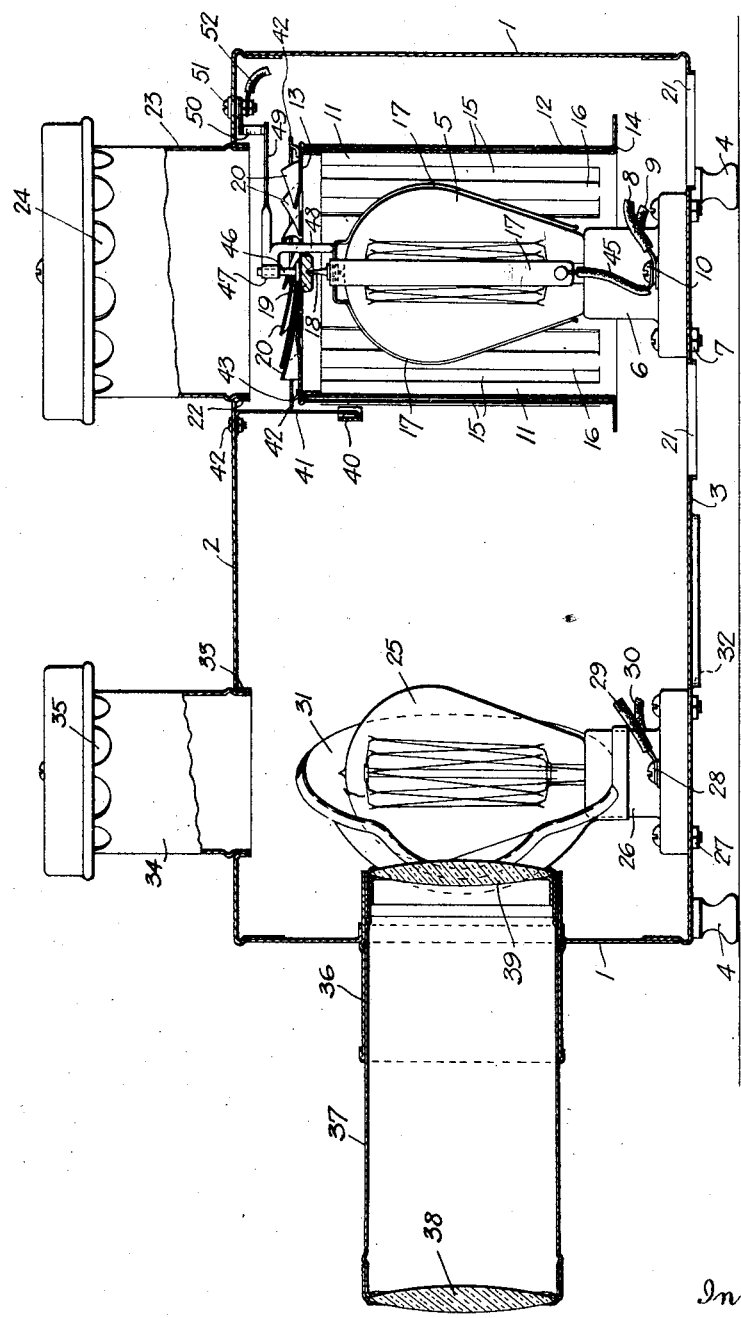
Figure 1 is a vertical sectional elevation of an apparatus constructed in accordance with the invention.

The particular form of apparatus illustrated in the drawings comprises an enclosing casing consisting of a side wall 1 and upper and lower walls 2 and 3, the bottom wall being provided with suitable feet or supports 4.

In this form of apparatus the rotatable element carrying the matter, objects or the like the images of which are to be projected is rotated by means of an upward current of heated air obtained by the use of a suitable heating element, which in the form shown is an electric lamp 5 mounted in a socket 6 of any suitable construction which is secured by means of bolts 7 to the bottom wall 3 of the casing substantially centrally at the rear part thereof. Current from a suitable source, for example an ordinary lighting circuit, is conducted by means of wires 8, 9 to the terminals 10 of the socket 6.

The rotatable element indicated generally by numeral 11 consists in the form shown of a hollow drum or cylinder 12 having a top wall 13 suitably secured thereto and having its lower edge flanged outwardly as at 14. The matter to be projected may be carried by the drum or cylinder in any suitable way and in the form shown this matter is intended to be printed or otherwise produced upon sheets or cards 15 held upon the drum or cylinder by means of reversely bent longitudinal portions 16 stamped out of the drum and arranged to hold the side edges of the sheets or cards 15, as clearly indicated in Figure 2. The upper edges of the sheets may engage the outer part of the top wall 13 of the drum and the lower edges thereof may be supported by the flange 14. It is to be understood, however, that this manner of mounting the matter to be projected is merely exemplary and that such matter may be mounted upon the drum in any desired manner. For example this matter might be arranged on a single sheet or card wrapped around the drum and suitably secured at its ends. Also if it is desired to project images of real objects or articles the same may be mounted upon the drum by means of suitable holding devices, or they might be mounted upon other forms of rotatable supporting means.

The drum or cylinder in the form shown is rotatably supported from the lamp 5 by means of a supporting device which comprises two pairs of spring members or fingers 17 which are suitably secured together at their upper ends as indicated in Figure 1 and are adapted to firmly grip about the bulb of the lamp to constitute a firm support. Carried by this supporting device at the upper end thereof is an upwardly projecting pivot member or point 18 and the top wall 13 of the drum or cylinder 12 is provided with a substantially frictionless bearing element 19 which may be of glass or the like, and which has a central bearing recess within which the bearing point 18 extends. By this means the drum or cylinder is supported for rotation in a substantially frictionless manner upon the lamp 5.

The top wall 13 of the drum or cylinder is cut out and bent upwardly to provide a plurality of vanes or blades 20 which together constitute a fan or propeller by means of which the drum or cylinder is rotated.

It will be understood that when the lamp 5 is lighted the air within the drum or cylinder 12 will become heated and will rise upwardly within the drum or cylinder passing through the apertures in the top wall 13 thereof and acting upon the vanes 20 so as to cause rotation of the drum or cylinder upon the bearing member or point 18. To provide for this upward current of heated air the bottom wall 3 of the casing is provided with suitable apertures 21 in the part thereof beneath the drum and the top wall is also provided with an aperture 22 within which may, if desired, be mounted a chimney 23 having outlet apertures 24 for the heated air at the upper part thereof.

It will, of course, be understood that the invention is not restricted to the use of an electric lamp for producing the heated current of air for rotating the drum or cylinder as other means may be provided for this purpose, for example, an electric resistance element suitably mounted beneath or within the drum or cylinder.

The means for illuminating the matter or objects carried by the drum or cylinder 12 preferably comprises electric lamps 25 arranged at opposite sides of the longitudinal center line of the casing adjacent the forward part thereof as clearly indicated in Figures 1 and 2, these lamps being mounted in suitable sockets 26 secured by means of bolts 27 to the bottom wall 3 of the casing. Current from a suitable source or lighting circuit is conducted to the terminals 28 of the sockets 26 by means of wires 29 and 30. The lamps are provided with suitable reflectors 31 properly disposed so that the light from the lamps is properly directed onto the matter to be illuminated carried by the drum or cylinder 12.

The bottom wall 3 of the casing may be provided with suitable apertures 32 and the top wall 2 with apertures 33 above the lamps 25 in order to provide for an upward flow of air through the forward part of the casing to maintain the same cool and to carry off the heat from the lamps. The apertures 33 may be provided therein with chimneys 34 having outlet apertures 35 at the upper parts thereof.

In the forward wall of the casing and in central longitudinal alignment with the axis of the drum or cylinder 12 is mounted a supporting tube 36 within which is arranged a lens tube 37 carrying lenses 38, 39 at the front and rear ends thereof, such lenses being arranged to project the reflected light from the matter or objects upon the drum or cylinder 12 forwardly upon a suitable receiving surface or screen suitably disposed with respect to the apparatus whereby an image or images of the matter or objects carried by the drum or cylinder is, or are, projected upon said receiving surface or screen. The lens tube 37 is slidably adjustable within the supporting tube 36 so as to enable the images thrown upon the receiving surface or screen to be properly focused.

It will be understood from the above description that when the apparatus is in operation the light from the lamps 25 will be thrown upon the matter or objects carried by the drum or cylinder 12 and will be reflected through the lens system 38, 39 and an image or images of such matter or objects thereby projected upon the receiving surface or screen and that as the drum or cylinder is rotated the several matters or objects carried thereby will be successively brought into the sphere of illumination and thereby images of said matters or objects successively projected upon the receiving surface or screen.

The matter carried by the drum or cylinder 12 may be in the nature of ordinary or usual advertisements, or may be in the nature of explanatory or descriptive matter explaining the characteristics of articles of merchandise or it may be any other kind of advertising descriptive or display matter. Also the real objects, such for example as articles of jewelry or the like, may be direcly mounted upon the drum or cylinder so that images of such objects or articles will be projected upon the receiving surface or screen. The apparatus is particularly capable of being used in store windows or like places to advertise or display articles of merchandise or to otherwise project or display advertising or other matter intended to attract the attention of the public.

The apparatus according to the invention is also arranged so as to provide for the projection of matter or an object or article additional to that carried by the rotating element or drum 12, such additional matter or object being so disposed that the projected image thereof will bear a relationship to, or appear as a part of the projected image of the matter or objects carried by the rotatable element or drum. This additional matter or object may be supported in a relatively stationary position with respect to the rotation of the drum or cylinder 12 by any suitable supporting means so that the projected image of this additional matter or object will appear relatively stationary with respect to the movement of the projected image of the matter carried by the drum or cylinder caused by the rotation of the latter. In the drawings this additional matter or object is indicated diagrammatically by the numeral 40 and as being supported or suspended immediately in front of the drum or cylinder by means of a fine supporting wire or rod 41 secured at its upper end as by means of a screw 42 to the upper wall of the casing. This additional matter or object 40 will also be illuminated by the lamps 25 and the projected image thereof will appear relatively stationary with respect to the moving projected image of the matter carried by the drum or cylinder 12. This additional matter or object will, of course, vary in form or outline depending upon the main matter or object which is to be projected and which is carried by the drum hence the additional matter or object is only indicated diagrammatically in the drawings. For example, if the main matter to be projected included a landscape view the additional object might represent an automobile or an aeroplane, the projected image of which would be stationary relatively to the projected image of the landscape view carried by the rotated drum, the movement of the view itself giving the appearance of travel of the automobile, aeroplane or other object relatively thereto.

Means may also be provided carried by the drum for imparting a movement or repeated movement to the additional object or matter 40 during the rotation of the drum so as to provide in the case of an automobile or the like as in the aforementioned illustration a more close simulation of the actual travel of such automobile or the like. In the form illustrated such means is shown in the form of a relatively fine wire supported by the top wall 13 of the drum as by means of small brackets 43, such wire at suitable points 44 being bent outwardly to a greater distance from the axis of the drum so as to engage the wire or support 41 of the object 40 and thereby produce a slight momentary vibration or rocking of the support or object 40 so as to provide for an adequate movement of the projected image of such object.

It will, of course, be understood that the object 40 may take any appropriate or desired form and may be either a real object or a representation of an object and that any suitable means, other than that shown, may be carried by the drum for effecting an appropriate movement of such object. For example, such means might be in the form of projections or cams on the cylindrical wall of the drum adapted to engage either the support of said additional object 40 or the object itself and adapted to impart a vibratory or rocking movement thereto, or an up and down movement as may be desirable to cause an appropriate movement of the projected image of said object.

Further matter or objects may, when so desired, be mounted on the drum or cylinder 11 in spaced relation to the cylindrical wall 12 thereof, so that the projected images of said object or objects will appear in a relief aspect or relation to the projected image of the main matter carried by sheets or cards 15. For example, in the case where the main matter consists of a landscape view, the further objects may represent trees or the like, in order to give a more realistic appearance to the view. In Figure 4, such further objects 60 are shown as mounted upon the flange 14 at the lower end of the cylinder or drum and they may be removably or otherwise secured thereon in any convenient manner, as by means of clips, screws 61, or similar fastening devices. The said further objects might equally well be secured to or mounted upon the extended peripheral edge of the top wall 13 of the drum, or be otherwise attached to the drum in spaced relation to the wall thereof, as by pasting or otherwise securing the same directly to the wall 12 of the drum. Such further objects might also be supported in a movable relation to the drum, as for example, by mounting the same on relatively loose pivots carried by the drum, so that such objects received a pivotal or like movement, either due to any slight vibration caused by the rotation of the drum, or to the action of relatively stationary means into engagement with which the objects are brought by the rotation of the drum. Such further objects may also be positioned so as to extend between the additional object 40 and the cylinder wall 12 or they may extend at the outer side of said object 40 depending upon circumstances.

The additional object 40, may of course also be arranged on a pivotal mounting, if desired, instead of being suspended by a flexible element, as shown in the drawings, and furthermore such object may be supported from the bottom wall 3 or from the side walls of the casing 1, instead of being suspended from the top wall 2, as shown.

It may also be desirable in some instances to provide in conjunction with the projecting apparatus, for example, in the case where the latter is used in the projection of advertisements in store windows, a device such as a buzzer or other audible signal, or a flashing light or lights or other visible signal in order to attract attention, and the invention contemplates provision for the control of a device for the above or other purposes from the rotatable or movable element carrying the matter to be projected.

One form of means for effecting such control electrically is diagrammatically indicated in the drawings such means controlling current from the source or lighting circuit connected with the lamp 5 to cause operation of a relay or like device which in turn may control the operation of a buzzer, flasher or other device.

To this end one of the terminals 10 of the socket 6 is connected by a wire 45 with one of the aforementioned fingers 17 carrying the bearing member or point 18. The top 13 of the drum 12 is provided with a central support or post 46 to which is secured, so as to rotate with the drum, a double contact member 47 one arm 48 of which is adapted during rotation of the drum to make contact with the upper ends of the fingers 17. The other arm 49 of the double contact 47 is adapted during rotation of the drum or cylinder 12 to be brought intermittently into engagement with a fixed contact 50 supported by means of a screw 51 from the top 2 of the casing and suitably insulated therefrom. As shown diagrammatically in Figure 4 the contact 50 is connected by a wire 52 at one end of the coil 53 of a relay or like device 54, the other end of the coil being connected with one of the return wires of the lighting circuit. The relay 54 controls a circuit 55 including a battery 56 and a buzzer or like device 57. Thus as the drum or cylinder rotates a circuit will be intermittently completed from one side of the lighting circuit through terminal 10, wire 54, fingers 17, contacts 48, 49, 50, wire 52 and relay coil 53 to the other side of the lighting circuit thereby energizing the relay and completing the circuit 55 to cause operation of the buzzer or like device, which buzzer is thus intermittently operated during the rotation of the drum or cylinder. It will be understood, of course, that the means shown is merely one form of means which might be used for the purpose, and that while a buzzer is indicated the invention is not restricted to the use thereof, but any other form of device may be employed the control of the same being intermittently effected due to the rotation of the drum or cylinder.

The contacts 48, 49, 50 will, of course, be of sufficient flexibility as not to cause any undesired interference with or disturbance of the movement of the drum or cylinder, and the contact 48 may be so arranged that by wiping over the upper ends of the fingers 17 a retarding influence will be exerted tending to retard somewhat the rotation of the drum and to prevent too rapid rotation thereof due to the action of the heated current of air.

The invention has been illustrated and described in connection with one specific form thereof and it is to be understood that this illustration and description is merely intended to be illustrative of the invention which is defined in the appended claims. It is also to be understood that where in such claims reference is made to "matter to be projected" such term is merely used in the interest of brevity and clearness and is not intended to be restrictive to printed or like matter, but is intended to cover any form of matter, object or article an image of which it is desired to project.

What I claim is:—

1. Projecting apparatus of the kind described, comprising in combination, a rotatable element carrying matter to be projected, means for rotating said element to present matter thereon successively for illumination, means on said element carrying additional matter to be projected spaced in front of the matter carried by said element, means arranged to illuminate both the matter carried by said element and said additional matter, and means for projecting images of said matter and additional matter.

2. Projecting apparatus of the kind described, comprising in combination, a rotatable element carrying matter to be projected, means for rotating said element to present matter thereon successively for illumination, an object to be projected supported by said element in front of the matter carried by said element, means arranged to illuminate said object and matter carried by said element, and means for projecting images of said object and matter.

3. Projecting apparatus of the kind described, comprising in combination, a rotatable element carrying matter to be projected, means for rotating said element to present matter thereon successively for illumination, means supporting an object to be projected in front of said element, means carried by said element for effecting a movement of said object relatively to said element, means arranged to illuminate said object and matter carried by said element, and means for projecting images of said object and matter.

4. Projecting apparatus of the kind described, comprising in combination, a rotatable element carrying matter to be projected, means for rotating said element to present matter thereon successively for illumination, means supporting an object to be projected in front of said element, means carried by said element for effecting an intermittent movement of said object relatively to said element, means arranged to illuminate said object and matter carried by said element, and means for projecting images of said object and matter.

5. Projecting apparatus of the kind described, comprising in combination, a base, an electric lamp socket thereon, an electric lamp bulb within said socket, supporting means carried by said bulb having a pivot at the upper end thereof, a continuously rotatable drum formed at its upper end to provide a propeller means, and provided centrally of said upper end with a pivot bearing supported on said pivot, said drum having exterior means for securing on the exterior thereof the matter or objects to be projected, other electric lamp sockets on said base in front of said drum, electric lamp bulbs in said sockets for illuminating the matter carried exteriorly on said drum, and means for projecting light reflected from said illuminated matter.

6. Projecting apparatus of the kind described, comprising in combination, a base, an electric lamp socket thereon, an electric lamp bulb within said socket, supporting means carried by said bulb having a pivot at the upper end thereof, a continuously rotatable drum formed at its upper end to provide a propeller means, and provided centrally of said upper end with a pivot bearing supported on said pivot, said drum having exterior means for securing on the exterior thereof the matter or objects to be projected, means supporting additional matter to be projected at a distance in front of the matter carried by said drum, other electric lamp sockets on said base in front of said drum, electric lamp bulbs in said sockets for illuminating the matter carried exteriorly on said drum, and said additional matter, and means for projecting light reflected from said illuminated matter.

7. Projecting apparatus of the kind described, comprising in combination, a base, an electric lamp socket thereon, an electric lamp bulb within said socket, supporting means carried by said bulb having a pivot at the upper end thereof, a continuously rotatable drum formed at its upper end to provide a propeller means, and provided centrally of said upper end with a pivot bearing supported on said pivot, said drum having exterior means for securing on the exterior thereof the matter or objects to be projected, means for supporting an object to be projected at a distance in front of the matter carried by said drum, means on said drum for effecting movement of said object with respect to said drum, other electric lamp sockets on said base in front of said drum, electric lamp bulbs in said sockets for illuminating the matter carried exteriorly on said drum, and said object, and means for projecting light reflected from said illuminated matter.

8. Projecting apparatus of the kind described, comprising in combination, a base, an electric lamp socket thereon, an electric lamp bulb within said socket, supporting means carried by said bulb having a pivot at the upper end thereof, a continuously rotatable drum formed at its upper end to provide a propeller means, and provided centrally of said upper end with a pivot bearing supported on said pivot, said drum having exterior means for securing on the exterior thereof the matter or objects to be projected, a flange at one end of said drum, additional matter or an object supported by said flange at a distance in front of the matter carried by the drum, other electric lamp sockets on said base in front of said drum, electric lamp bulbs in said sockets for illuminating the matter carried exteriorly on said drum, and said additional matter or object, and means for projecting light reflected from said illuminated matter.

9. Projecting apparatus of the kind described, comprising in combination, a rotatable drum element carrying exteriorly thereof matter to be projected, means for causing continuous rotative movement of said drum, means arranged in front of said drum for illuminating matter carried exteriorly thereof, means for projecting an image of the illuminated matter, a signalling device, and means carried by and rotating with said drum for intermittently operating said signalling device in synchronism with the movements of the drum.

10. Projecting apparatus of the kind described, comprising in combination, a movable element carrying matter to be projected, means for effecting movement of said element, means for supporting objects on said element at a distance in front of the matter carried thereby, means for illuminating simultaneously matter and objects carried by said element, and means for projecting an image of said illuminated matter and objects.

11. Projecting apparatus of the kind described, comprising in combination, a movable element carrying matter to be projected, means for effecting movement of said element, means for supporting objects on said element at a distance in front of the matter carried thereby, illuminating means disposed so as to throw light simultaneously upon matter and objects carried by said element, and means disposed so as to receive and project light reflected from said matter and objects.

In testimony whereof I affix my signature.

EDWARD ALFRED BERNSTEIN.